UNITED STATES PATENT OFFICE.

SAMUEL M. D. MILLER, OF DETROIT, MICHIGAN.

CLUTCH.

1,279,136.

Specification of Letters Patent.   Patented Sept. 17, 1918.

Application filed July 28, 1917. Serial No. 183,218.

*To all whom it may concern:*

Be it known that I, SAMUEL M. D. MILLER, a citizen of the United States of America, residing at Detroit, in the county of Wayne and State of Michigan, have invented certain new and useful Improvements in Clutches, of which the following is a specification, reference being had therein to the accompanying drawings.

This invention relates to improvements in clutches especially adapted for motor vehicles, and its object is to provide a clutch assembly which may be readily applied as a unit to any plane surface to connect the member having such surface, with a member in axial alinement therewith, and a further object is to provide a construction whereby a single spring may operate to turn one of a plurality of power members for engaging the clutch members and may also operate to release the clutch members when the power member is operated against the action of said springs, whereby the construction is simplified and a very compact and efficient device is secured. It is also an object of the invention to facilitate removal of the parts for replacement or repair and to provide certain other new and useful features in the construction and arrangement of parts.

With these and other ends in view the invention consists in the matters hereinafter set forth and more particularly pointed out in the appended claims, reference being had to the accompanying drawing, in which—

Figure 1:
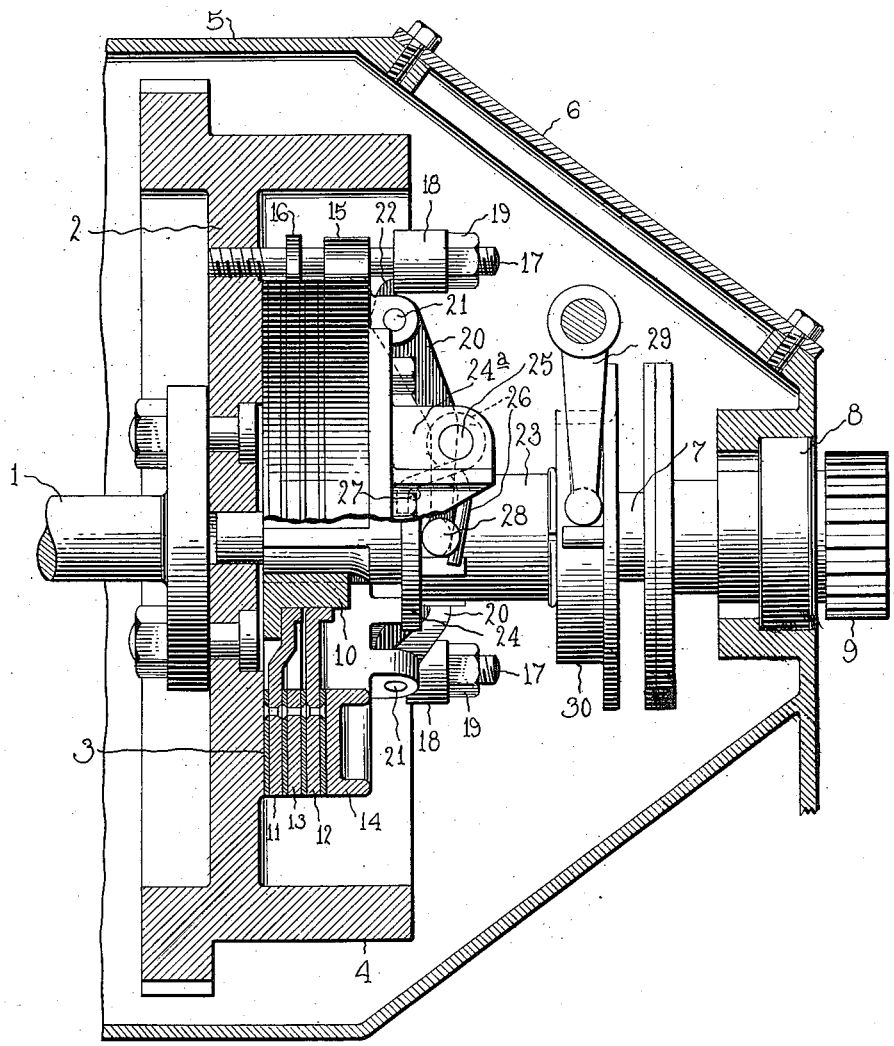
Figure 2:
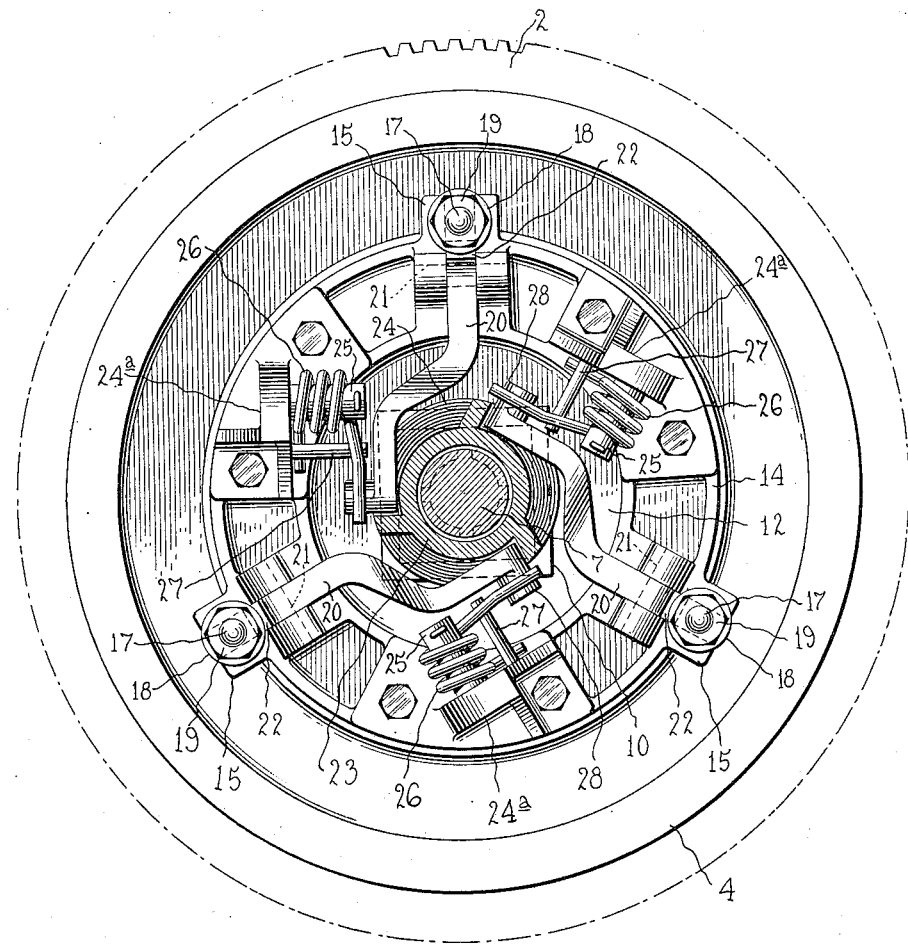

Figure 1 is a longitudinal vertical section through a device illustrative of the invention and showing certain parts partially in section and partially in side elevation; and Fig. 2 is an end elevation of the same removed from its casing.

As shown in the drawings, 1 represents a driving shaft which may be the crank shaft of an engine, and 2 is a suitable fly wheel secured thereon having a web portion with a plane annular face 3 at its rear side and an overhanging flange 4. A suitable inclosing casing 5 is shown, which casing may be the rear end of the crank case of an engine in a motor vehicle construction and to the rear end of which casing a change speed transmission casing (not shown) may be secured, a suitable hand hole and cover 6 therefor being provided in the upper side of the casing. A driven shaft 7 has a bearing at its forward end in an axial recess in the fly wheel and a bearing 8 is provided for the rear end of said shaft in the rear end of the casing. A gear 9 which may be one of the gears of the change speed mechanism, is secured to the rear end of the shaft 7 outside the casing 5. A hub 10 is mounted upon the forward end of the shaft 7 adjacent the fly wheel to turn with the shaft and to move freely in a longitudinal direction thereon, and on a squared portion of this hub is a pair of friction disks 11 and 12 turning with the hub and shaft and having a longitudinal movement thereon. The disk 11 is faced with a suitable friction material to engage the annular plane surface 3 of the fly wheel and interposed between the disks 11 and 12 is a friction ring 13 also faced with friction material to engage the two disks 11 and 12.

A master ring 14 is provided to engage the rear face of the disk 12 which has friction material secured thereon, and this ring, and the friction ring 13 are provided with ears 15 and 16 respectively, having holes therein to receive stud bolts 17 which are tapped into the web of the fly wheel and extend adjacent to the edges of the friction disks. These stud bolts form guides for the friction ring and master ring to hold the same centered relative to the friction disks and permit a free movement of the rings thereon when the master ring is forced toward the fly wheel face to clamp the disks and ring. Each stud bolt is provided with a sleeve member 18 and an adjusting nut 19 on its outer end, and a series of levers 20, one for each stud bolt, is pivoted at 21 between ears on the master ring, and each lever is provided with a lug 22 to engage beneath the inner end of the adjacent sleeve 18 on its stud bolt.

Slidable longitudinally upon the driven shaft 7 is an operating sleeve 23 and this sleeve is provided at its inner end with a flange 24 to be engaged by a round head or end on the inner end of each lever 20.

Brackets 24ª are bolted to the outer side of the master ring 14, and each bracket is provided with a stud 25 projecting inwardly toward the inner end portion of one of the levers 20. A coiled spring 26 is sleeved upon each stud with one end of the spring engaged beneath a pin 27 projecting inwardly from each bracket parallel with the stud thereon, and with the other end of the spring passed over said pin and engaged with the head or laterally projecting end portion 28 on each adjacent lever 20. The full force of these coiled springs is thus applied to the extreme ends of the levers to turn the same upon their pivots 21 and, by reason of the engagement of the lugs 22 on the levers beneath the collars 18, the master ring will be forced toward the fly wheel with a very strong pressure and clamp the friction members between said ring and wheel.

When the sleeve 23 is moved outwardly against the inward pressure of the springs 26, by a suitable lever 29 mounted on the casing 5 and engaging a collar 30 rotatively mounted on the sleeve, the resistance of these springs which are mounted upon the master ring, will cause said ring to move outwardly with the sleeve 23 and thus be disengaged from the friction disk 12. The springs 23 thus serve to force the friction members into contact and also to separate the same when the clutch is released. By reason of the application of the force of these springs to the free ends of the levers, said force is greatly multiplied due to the leverage exerted by said levers upon the sleeves 18 adjustably secured upon the stud bolts 17.

As the ends of the pins 27 extend beneath the ends of the springs 26 which are engaged with the levers 20, upon removal of any one of these levers, its spring 26 will still be held under tension by said pin and in place upon the stud 25. Another lever may therefore be readily installed by hooking its end 28 beneath the projecting end of the spring and then securing it in place between the ears on the master ring, by its pivot pin 21. The removal and replacement of any one of the levers may thus be quickly and easily effected without disturbing or dismounting the other parts. With levers removed, it is possible to readily remove and renew the springs 26.

By this arrangement of springs a smooth even engagement of the friction members is effected and the release of the clutch secured, and compactness and simplicity of construction is also a feature thereof.

The disks 12 and 13 may be omitted, for light duty clutches, and friction fiber or material placed on both sides of disk 11 without changing the mechanical operation of the clutch. Conversely, for heavy duty clutches, any desired number of disks similar to disks 12 and 13 may be used if found desirable.

Obviously, other changes in the details of construction may be made without departing from the spirit of the invention, and I do not care to limit myself to any particular form or arrangement of parts.

What I claim is:—

1. In a device of the character described, the combination with a driving member and a driven member, of a friction member movable longitudinally of said members, a plurality of operating members for moving said friction member, and springs each carried by said friction member and each engaging one of said operating members to operate the same and move the friction member into operative position, and means for moving said operating members to release said friction member and through said springs to move the said friction member into inoperative position.

2. In a device of the character described, the combination with a driving member and a driven member, of a friction member to turn with one of said members and adapted to be moved into frictional engagement with the other member, power means for moving said friction members into frictional position, springs mounted upon and carried solely by said friction member and engaging said power means to yieldingly operate said power means and force said friction member into frictional position, and means for moving said power means against the action of said springs.

3. In a device of the character described, the combination of a driving member and a driven member, a friction member, levers on the friction member, springs on the friction member, one for each lever, and means for moving the levers against the action of said springs and through the connection of said springs with said friction member, for moving said friction member into inoperative position.

4. In a device of the character described, the combination of a driving member, a driven member, a friction member, a plurality of levers carried by said friction member, a coiled spring for each lever with one end operatively engaged with said friction member and the other end thereof engaging one of said levers, and means for operating said levers against the action of said springs.

5. The combination with a driving member and a driven member, one of said members having a friction surface, of a unitary structure adapted to be applied to said member having said surface and comprising a friction member to oppose said surface, operating means including power means carried solely by said friction member for operating the same, and means adapted to be secured to and detachable from said member having said friction surface and forming an abutment for said operating means.

6. In combination with a driving member and a driven member in axial alinement therewith, of a unitary structure comprising a friction member to oppose said driving member, operative means including power means for operating said friction member carried wholly thereby, and abutment members on the driving member for said operating means.

7. In combination with a driving member having a plane surface and a driven member in axial alinement therewith, of a unitary structure comprising a friction disk to oppose said surface, a friction ring to oppose the disk, levers pivotally attached to the ring, springs on the ring with a free end of each spring engaging a lever, and studs detachably secured to the driving member around the disk and ring and forming abutments for the said levers.

8. In a friction clutch, the combination with a driving member and a driven member, of a friction member connected to turn with one of said members and movable thereon toward and from the other member, a plurality of levers on the friction member for moving the same, coiled springs mounted on the friction member with one end of each engaged therewith and the opposite end engaging one of said levers, and means for turning said levers against the action of said springs.

9. In a clutch, the combination with a driving member and a driven member, of a friction member mounted upon one of the members to turn therewith and movable toward and from the other member, levers on the friction member, supports on the friction member adjacent the ends of said levers, springs coiled about said supports with one end of each spring connected to said friction member to exert a lifting force thereon and the other end overlying the end of the adjacent lever to operate said levers and move the friction member into operative position, and means for turning all of said levers against the action of the ends of the springs engaging the same to release the friction member and through the action of said springs move said member into inoperative position.

10. In a clutch, the combination with a driving member and a driven member, of a friction member mounted upon one of the members to turn therewith and movable toward and from the other member, levers on the friction member, brackets on the friction member adjacent the ends of the levers, studs on the brackets extending toward the levers, coiled springs sleeved upon the studs and formed with laterally extending ends, one of which ends of each spring is adapted to engage the adjacent lever, pins on the brackets extending between the laterally projecting ends of the springs, and means to engage all of the levers and move the same against the action of said springs.

In testimony whereof I affix my signature in the presence of two witnesses.

SAMUEL M. D. MILLER.

Witnesses:
 LEWIS E. FLANDERS,
 ANNA M. DORR.